United States Patent  [10] Patent No.: US 6,963,303 B1
Beisner                    [45] Date of Patent:    Nov. 8, 2005

(54) ADAPTIVE FILTER TO REDUCE MULTIPATH

(75) Inventor: Henry Michaels Beisner, 11904 Tildenwood Dr., Rockville, MD (US) 20852

(73) Assignee: Henry Michaels Beisner, Rockville, MD (US)

( * ) Notice: Subject to any disclaimer, the term of this patent is extended or adjusted under 35 U.S.C. 154(b) by 136 days.

(21) Appl. No.: 10/640,624

(22) Filed: Aug. 13, 2003

Related U.S. Application Data

(63) Continuation-in-part of application No. 09/847,093, filed on May 2, 2001.
(60) Provisional application No. 60/202,938, filed on May 9, 2000.

(51) Int. Cl.[7] .............................. G01S 13/00; H04B 1/69
(52) U.S. Cl. ........................ 342/159; 342/189; 375/148
(58) Field of Search ................................ 342/159, 189, 342/194; 375/141, 148, 346

(56) References Cited

U.S. PATENT DOCUMENTS 6,650,271 B1 * 11/2003 Simone et al. ................ 342/16

* cited by examiner

Primary Examiner—Thomas H. Tarcza
Assistant Examiner—Brian K Andrea

(57) ABSTRACT

The direct path of a radio signal from the transmitter to the receiver is frequently interfered with by reflections of the transmitted signal from stationary and moving objects. These reflections are known as multipath noise. The multipath canceler of this invention takes as input the direct path signal plus multipath noise. The canceler, after canceling the multipath noise, outputs a purified version of the direct path signal nearly devoid of multipath noise. The output of the canceler is fed back to a bank of delayers and frequency shifters. The outputs of this bank of delayers and frequency shifters are multiplied by a set of adjustable coefficients. These coefficients are adjusted to form very accurate replicas of the multipath reflections caused by each reflector. Which replicas are subtracted from the input which is the original direct path signal plus the multipath noise. The result of this subtraction is called the residual and is a purified version of the direct path signal nearly devoid of multipath noise. The coefficients are determined by nonlinear least squares which finds that set of coefficients which minimize the mean square of the residual. Each coefficient is associated with a delay and a frequency shift. The amplitude of a coefficient is a measure of the magnitude of a reflector and the differential delay and frequency shift caused by said reflector. If an object is a target, its differential range, range rate and magnitude is got from the measured differential delay, frequency shift and amplitude of the coefficient. Position and velocity of the target can be obtained by geometric triangulation with multiple transmitters. Target angle can be measured from the relative phase angles of the corresponding filter coefficients, if complex, across multiple antennas receiving the same signal from the same transmitter. The system, comprising the antennas, receivers, signal processor, multipath cancelers and target estimators, can be used on a surveillance aircraft to cancel ground reflections and track targets.

6 Claims, 1 Drawing Sheet

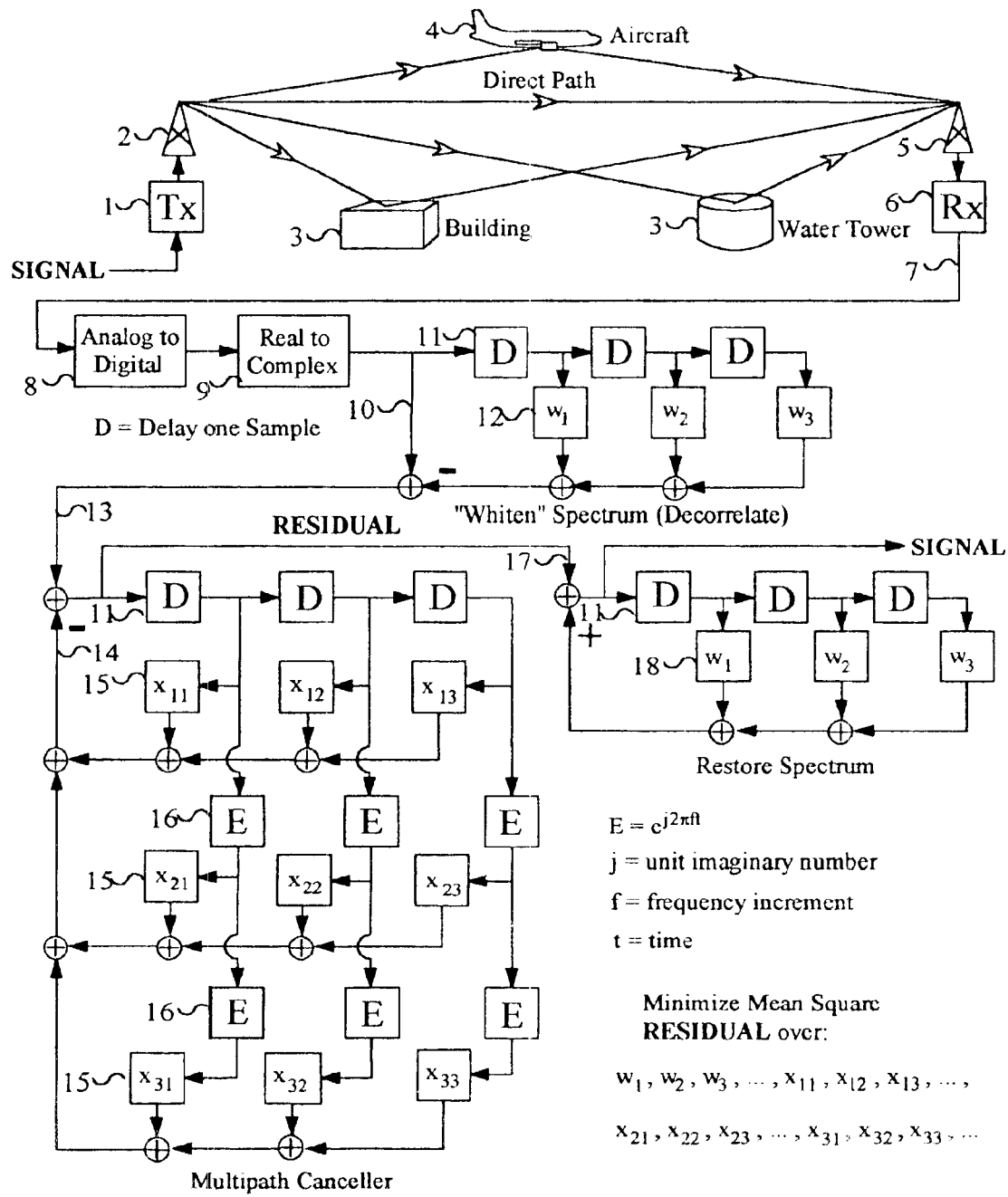

ADAPTIVE FILTER TO REDUCE MULTIPATH

This application is a CIP of application Ser. No. 09/847,093 filed May 2, 2001 and claims benefit of provisional application Ser. No. 60/202,938, filed May 9, 2000.

BACKGROUND

The direct path of a radio signal from the transmitter to the receiver is frequently interfered with by reflections of the transmitted signal from stationary and moving objects which reflections are also received by the receiver. These reflected signals are delayed and frequency shifted versions of the direct path signal. When mixed with the direct path signal, the reflected signals corrupt the direct path signal and constitute what is known as multipath noise. In order to cancel the multipath reflections, current multipath canceling methods [References 1 through 10] first measure them. These methods correlate (cross correlate or autocorrelate) two versions of the signal each containing the direct path and multipath reflections. For example, the direct path signal plus multipath reflections is multiplied by a delayed version of the signal plus multipath. The delay is variable. A correlation peak between the direct path and a reflection at a specific value of the variable delay gives a measure of the relative delay between the direct path and the reflected path and a measure of the relative amplitude of the refection. However, when the variable delay matches the relative delay between two reflections, undesired correlation peaks are produced. These peaks are multipath cross correlation noise and they corrupt the measurement process. Once the multipath reflections have been measured, the signal plus multipath is delayed and adjusted in amplitude such that the modified direct path signal portion approximately matches each reflected signal. These modified versions are, then, subtracted from the original signal plus multipath, reducing the multipath noise. However, even if the modified direct path signal portion perfectly matches the multipath reflections and they are totally canceled in the original signal plus multipath, the modified versions contain multipath reflections as well. This adds secondary multipath noise to the signal being restored and corrupts the result. The invention described in this disclosure avoids this multipath cross correlation noise and the secondary multipath noise. This invention reduces the multipath noise by an improved method of canceling the reflected versions of the direct path signal. This method delays a purified version of the direct path signal, nearly devoid of multipath noise, and cancels each component of the multipath noise, in constant to other methods which delay a version of the direct path signal containing significant multipath noise and attempt to cancel the multipath noise with it. The differential delay, frequency shift, relative amplitude and phase shift due to each reflector are produced by the canceling process. These parameters can be used in a surveillance system to locate and track particular reflectors of interest, that is, targets.

BRIEF SUMMARY

This method delays a purified version of the direct path signal, nearly devoid of multipath noise, and cancels each component of the multipath noise, in contrast to other methods which delay a version of the direct path signal containing significant multipath noise and attempt to cancel the multipath noise with it. The multipath canceler of this invention takes as input the direct path signal plus multipath noise. The canceler, after canceling the multipath noise, outputs a purified version of the direct path signal nearly devoid of multipath noise. The output of the canceler is fed back to a bank of delayers and frequency shifters. The outputs of this bank of delayers and frequency shifters are multiplied by a set of adjustable coefficients. These coefficients are adjusted to form very accurate replicas of the multipath noise caused by each reflector. Which replicas are subtracted from the input which is the original direct path signal plus the multipath noise. The result of this subtraction is called the residual and is a purified version of the direct path signal nearly devoid of multipath noise. The coefficients are determined by a method which finds that set of coefficients which minimize the mean square of the residual. When the residual, that is, the signal plus multipath noise minus the replicas of the reflected signals, is minimized, the multipath noise is almost totally canceled. The method of determining the set of coefficients which minimize the mean square residual is nonlinear least squares. Newton's method for solving nonlinear equations was generalized by Gauss to find the parameters of planetary orbits by minimizing the mean of the squares of the residuals of the observations, a nonlinear problem. The said coefficients can be determined by the Marquardt method, an improved version of the Gauss-Newton method. At first, one may think that this invention is like pulling oneself up by his own bootstraps. That this is not the case is proven by the mathematical explanation, the computer simulation in the Appendix and the fact that G. E. P. Box had very good success in a similar application. Each coefficient is associated with a delay and a frequency shift. The amplitude of a coefficient is a measure of the magnitude of a reflector and the differential delay and frequency shift caused by said reflector. If an object is a target, its differential range, range rate and magnitude is got from the measured differential delay, frequency shift and amplitude of the coefficient. Position and velocity of the target can be obtained by geometric triangulation with multiple transmitters. Target angle can be measured from the relative phase angles of the corresponding filter coefficients, if complex, across multiple antennas receiving the same signal from the same transmitter. The system, comprising the antennas, receivers, signal processors, multipath cancelers and target estimators, can be used on a surveillance aircraft to cancel ground reflections and track targets.

BRIEF DESCRIPTION OF DRAWING

The FIGURE is a block diagram illustrating the invention to reduce multipath in a radio transmitted signal 1, 2. The direct path of a radio signal from the transmitter 1 and transmitting antenna 2 to the receiving antenna 5 and receiver 6 is frequently interfered with by reflections of the transmitted signal from stationary 3 and moving objects 4 which reflections are also received by the receiver 6. These reflected signals are delayed and frequency shifted versions of the direct path signal. When mixed with the direct path signal the reflected signals corrupt the direct path signal and constitute what is known as multipath noise. The direct path signal plus multipath noise 7, after conversion to complex samples 8, 9, 10, is whitened 11, 12, 13. The canceling method works best on white signals; therefore, prewhitening 12 and post unwhitening 18 filters are employed. The multipath canceler of this invention takes as input the whitened direct path signal plus multipath noise 13. The canceler, after canceling the multipath noise 13, 14, 17, outputs a purified version 17 of the direct path signal nearly devoid of multipath noise. This is the residual 17. The output 17 of the canceler is fed back to a bank of delayers 11 and frequency shifters 16. The outputs of this bank of delayers and frequency shifters are multiplied by a set of adjustable coefficients 15. These coefficients are adjusted to form very accurate replicas 14 of the multipath noise caused by each reflector. Which replicas are summed and subtracted 14 from the input 13 which is the whitened direct path signal plus the multipath noise. The result of this subtraction is called the residual 17 and is a purified version of the whitened direct path signal nearly devoid of multipath noise. The differential delay and frequency shift for each reflector 3, 4 is measured by the filter weight $x_{mn}$ 15 which corresponds to the differential delay nD and frequency shift mf caused by that reflector 3, 4. The magnitude of the filter weight is a measure of the strength of the reflector 3,4. The filter weight $x_{mn}$ corresponding to a moving target 4 is a measure of the differential range nDc and range rate mfc where c is the speed of light. The coefficients are determined by a method which finds that set of coefficients 12, 15 which minimize the mean square of the residual 17. The quantity labeled residual 17 in the Figure is the received signal 13 minus the result 14 of application of the filter weights 12, 15 $w_1, w_2, w_3, \ldots, x_{11}, x_{12}, x_{13}, \ldots, x_{21}, x_{22}, x_{23}, \ldots, x_{31}, x_{32}, x_{33}, \ldots$. A nonlinear least squares method is used to pick the filter weights which minimize the mean square of the residual. When the residual 17, that is, the whitened direct path signal plus multipath noise 13 minus the replicas 14 of the reflected signals, is minimized, the multipath noise is almost totally canceled. The key to understanding the operation of this invention is the recognition that the residual 17 is a highly accurate estimate of the whitened direct path signal. This residual 17 is, then, unwhitened 17, 11, 18. The result is a very accurate estimate of the original direct path signal.

DETAILED DESCRIPTION

The direct path of a radio signal from the transmitter 1 and the transmitting antenna 2 to the receiving antenna 5 and receiver 6 is frequently interfered with by reflections of the transmitted signal from stationary 3 and moving objects 4 which reflections are also received by the receiver 6. These reflected signals are delayed and frequency, or Doppler, shifted versions of the direct path signal. When mixed with the direct path signal, the reflected signals corrupt the direct path signal and constitute what is known as multipath noise.

The direct path signal plus multipath noise 7, after conversion to complex samples 8, 9, 10, is whitened 11, 12, 13. The multipath canceler of this invention takes as input the whitened direct path signal plus multipath noise 13. The canceler, after canceling the multipath noise 13, 14, 17, outputs a purified version 17 of the direct path signal nearly devoid of multipath noise. This is the residual 17. The output 17 of the canceler is fed back to a bank of delayers 11 and frequency shifters 16. The outputs of this bank of delayers and frequency shifters are multiplied by a set of adjustable coefficients 15. These coefficients are adjusted to form very accurate replicas 14 of the multipath noise caused by each reflector. Which replicas are summed and subtracted 14 from the input 13 which is the whitened direct path signal plus the multipath noise. The result of this subtraction is called the residual 17 and is a purified version of the whitened direct path signal nearly devoid of multipath noise. The coefficients are determined by a method which finds that set of coefficients 12, 15 which minimize the mean square of the residual 17. When the residual 17, that is, the whitened direct path signal plus multipath noise 13 minus the replicas 14 of the reflected signals, is minimized, the multipath noise is almost totally canceled. The key to understanding the operation of this invention is the recognition that the residual 17 is a highly accurate estimate of the whitened direct path signal. This residual 17 is, then, unwhitened 17, 11, 18. The result is a very accurate estimate of the original direct path signal.

The method of determining the set of coefficients 12, 15 which minimize the mean square residual 17 is nonlinear least squares. Newton's method for solving nonlinear equations was generalized by Gauss to find the parameters of planetary orbits by minimizing the mean of the squares of the residuals of the observations, a nonlinear problem. The said coefficients can be determined by the Marquardt method, an improved version of the Gauss-Newton method of nonlinear least squares. At fist, one may think that this invention is like pulling oneself up by his own bootstraps. That this is not the case is proven by the mathematical explanation, the computer simulation in the Appendix and the fact that G. E. P. Box had very good success in a similar application. Each coefficient 15 is associated with a delay and a frequency shift. The amplitude of a coefficient is a measure of the magnitude of a reflector and the differential delay and frequency shift caused by said reflector. If an object is a target, its differential range, range rate and magnitude is got from the measured differential delay, frequency shift and amplitude of the coefficient. Position and velocity of the target can be obtained by geometric triangulation with multiple transmitters. Target angle can be measured from the relative phase angles of the corresponding complex filter coefficients across multiple antennas receiving the same signal from the same transmitter. The system, comprising the antennas, receivers, signal processors, multipath cancelers and target estimators, can be used on a surveillance aircraft to cancel ground reflections and track targets.

In order to cancel the multipath reflections, current multipath canceling methods [References 1 through 10] first measure them. To do the measurement, these methods correlate (cross correlate or autocorrelate) two versions of the signal each containing the direct path and multipath reflections. For example, the direct path signal plus multipath reflections is multiplied by a delayed version of the signal plus multipath. The delay is variable. A correlation peak between the direct path and a reflection at a specific value of the variable delay gives a measure of the relative delay between the direct path and the reflected path and a measure of the relative amplitude of the refection. However, when the variable delay matches the relative delay between two reflections, undesired correlation peaks are produced. These peaks are multipath cross correlation noise and they corrupt the measurement process.

Once the multipath reflections have been measured, the signal plus multipath is delayed and adjusted in amplitude such that the modified direct path signal portion approximately matches each reflected signal. These modified versions are, then, subtracted from the original signal plus multipath, reducing the multipath noise. However, even if the modified direct path signal portion perfectly matches the multipath reflections and they are totally canceled in the original signal plus multipath, the modified versions contain multipath reflections as well. This adds secondary multipath noise to the signal being restored and corrupts the result.

The invention described in this disclosure avoids this multipath cross correlation noise and the secondary multipath noise. This invention reduces the multipath noise by an improved method of canceling the reflected versions of the direct path signal. This method delays a purified version of the direct path signal, nearly devoid of multipath noise, and cancels each component of the multipath noise, in contrast to other methods which delay a version of the direct path signal containing significant multipath noise and attempt to cancel the multipath noise with it. The differential delay, frequency shift, relative amplitude and phase shift due to each reflector are produced by the canceling process. These parameters can be used in a surveillance system to locate and track particular reflectors of interest, that is, targets.

The Figure is a block diagram illustrating the adaptive filter of the invention to reduce multipath in a radio transmitted signal 1,2 wherein the multipath is caused by reflections from fixed 3 and moving objects 41 interferers, or targets 4.

The original signal is modulated and amplified by the transmitter, Tx 1 [Ref. 17, ROHDE, p.14]. The original signal is defined as that signal which rides on the carrier. If one band passes the transmitted signal and, then, band shifts the result down near zero frequency, he obtains the original signal. The original signal is formed after the unique modulation such as AM, FM, etc. is done. After transmission from the antenna 2, most of the power takes the direct path to the receive antenna 5. Some power, however, is reflected from stationary 3 and moving 4 objects such as buildings and aircraft. When a reflection arrives at the receive antenna 5, it is a delayed and attenuated version of the direct path signal. If the reflector is moving 4, there is also a frequency shift. At the receive antenna 5, these reflections combine with the direct path and cause what is known as multipath interfere noise[Ref. 18, SKOLNIK, p. 18.46].

This invention removes the multipath noise from the received signal. The direct path signal plus the multipath noise plus the receiver noise, after conversion to complex samples 10, is whitened in eq. (15) 13. The multipath 14 is canceled 13, 14, 17 in eq. (17) by nonlinear least squares in eq. (20). Unwhitening 17, 11, 18 is performed in eq. (16) to produce the restored direct path signal. The processing which accomplishes this will be described in detail and the operation will be explained in what follows.

The signal at the receive antenna 5 is amplified and demodulated by the receiver, Rx 6 [Ref. 17, ROHDE, p. 361][Ref. 19, VAN VALKENBURG, p. 23–6. This demodulation consists of band passing the received signal and band shifting, hetrodyning, the result down to near zero frequency. At this point 7, the direct path signal plus multipath noise plus receiver noise is analog. It is, then, fed to Analog to Digital processing 8. Which processing is comprised of a presampling filter, sampler and analog to digital converter [Ref. 19, VAN VALKENBURG, p. 28–7][Ref. 20, HAYES, p. 101]. The output of Analog to Digital processing is a sequence of real digital samples which are fed to Real to Complex processing 9. An alternative to the analog receiver 6 is a digital receiver. In which case, the Analog to Digital processing is moved forward toward the antenna 5.

The preferred initial embodiment of this invention is to process the output of the Analog to Digital conversion with a digital computer and to produce the final results in digital form. The restored signal will be in digital form which can be converted to analog if desired. Later embodiments would include special purpose signal processing hardware for the signal processing in the Figure: Real to Complex, Whitening, Multipath Canceler and Restore Spectrum. The nonlinear least square function could also be done in special purpose hardware.

Real to Complex processing 9 converts the sequence of real samples to a sequence of complex samples. The real digital samples have a Fourier transform the real part of which is symmetric about zero frequency and the imaginary part of which is antisymmetric about zero frequency. From this redundancy, one can see that one needs only half of the frequencies in the Fourier transform, that is, half the time samples if they are complex. The real samples have a maximum frequency of 2F and a sampling frequency of 4F. The complex samples will have a maximum frequency of F and a sampling frequency of $$2F = \frac{1}{D}$$

where D is the time between complex samples. To convert from real samples to complex samples 9, the real samples are first frequency down shifted by multiplying by $e^{-j2\pi Ft}$ where $$t = i\frac{D}{2}$$

is time[Ref. 14, PAPOULIS, p. 15] and i is the real sample index. These complex samples are then passed through a low pass digital filter with a maximum frequency of F [Ref. 16, RABINER, p. 100][Ref. 13, OPPENHEIM, p. 261][Ref. 20, HAYES, pp. 1, 2, 110]. The output of the low pass filter is resampled at a frequency of $$2F = \frac{1}{D},$$

that is, every other sample is taken to obtain the complex samples of the received signal 10.

The reason for converting to complex samples 10 is that during processing, the samples will not only be delayed 11 but also frequency shifted 16. This frequency shifting can be easily affected by multiplying the complex samples by a complex exponential 16. See eqs. (1, 12, 13, 17). Complex phase is also used in measuring the angle of a target. See eq. (38).

The received signal, that is, the direct path signal plus multipath noise plus white receiver noise, after demodulation, analog to digital conversion and conversion to complex samples 10, can be modeled as $$q_i = s_i + \sum_{n=1}^{N} \sum_{m=-M}^{M} a_{mn} e^{-j2\pi m f n D} s_{i-n} E^m + \eta_i; \quad i = 1, 2, \ldots, I \quad (1)$$

where

| | |
|---|---|
| $S_i$=original direct path signal | (2) |
| i=sample index | (3) |
| D=sampling time interval | (4) |
| n=time delay index for each reflector | (5) |
| f=frequency shift frequency interval | (6) |
| m=frequency shift index for each reflector | (7) |
| $a_{mn}$=Multipath amplitude coefficient for each reflector | (8) |
| j=unit imaginary number | (9) |
| e=base of natural logarithms | (10) |
| π=pi | (11) |
| $E=e^{j2\pi ft}$ | (12) |

$$t = iD \quad (13)$$

$$\eta_i = \text{white receiver noise} \quad (14)$$

Each term in the double sum of eq. (1) represents a reflector causing a delay of the direct path signal of nD, a frequency shift of mƒ and an amplitude attenuation of $a_{mn}$. When E of eq. (12) and t of eq. (13) are substituted into eq. (1), one obtains the term in the double sum $a_{mn}s_{i-n}e^{j2\pi mf(i-n)D}$ which represents the i-th multipath sample at the time delay of the direct path signal of nD and the frequency shift of mƒ. The complex exponential coefficient accomplishes the frequency shift of the time delayed complex direct path signal $S_{i-n}$. The coefficient $a_{mn}$ is the complex magnitude (at the receive antenna) of the multipath reflector at differential (between the direct path length and the reflected path length) distance nDc and differential velocity mƒc where c is the speed of light.

If the spectrum of the direct path signal is not white, there can be correlation between one time point of the signal and another. This allows the multipath canceler, with the appropriate delay coefficients 15, to partially cancel the direct path signal as well as the multipath. Putting the direct path signal through a whitening filter 12 avoids this signal suppression. This will be explained in eq. (26). Note that since the multipath reflections are replicas of the direct path signal, they are also whitened. Note that the initial white receiver noise is modified by the whitening filter and is no longer white.

The direct path signal plus multipath plus white receiver noise $q_i$ 10 is fed into the whitening filter. The whitening filter is comprised of a sequence of one sample delays 11. This sequence is tapped after each delay and fed to the filter weights $w_l$ 12. These inputs are multiplied by the filter weights the outputs from which are summed and subtracted from $q_i$ 10 forming the whitened direct path signal plus multipath plus receiver noise 13

$$v_i = q_i - \sum_{l=1}^{L} w_l q_{i-l} \quad (15)$$

These filter weights are adjusted by least squares to remove any correlation from the input 10. This adjustment is done as part of the nonlinear least square minimization of the residuals. The identical (to the whitening filter) filter weights 18 are used in the unwhitening filter to restore the spectrum. The operation of the whitening filter will be explained in eq. (23).

The output of the whitening filter 13 is fed to the multipath canceler which subtracts off the sum of the multipath replicas 14 to form the residual 17. The key to understanding the operation of this invention is the recognition that the residual 17 is a highly accurate estimate of the whitened direct path signal. The residual is passed through the unwhitening filter 11, 18 which restores the spectrum of the direct path signal yielding a highly accurate estimate of the original direct path signal $$u_i = r_i + \sum_{l=1}^{L} w_l u_{i-l} \quad (16)$$

The unwhitening filter is similar to the whitening filter, however, it is a recursive filter, that is, the outputs are fed back as inputs. The sequence of delays 11 is the same and the filter weights 18 are identical to those of the whitening filter 12. The operation of the unwhitening filter will be explained in eqs. (31) and (32).

The replicas 14 are formed as follows. The output of the multipath canceler, the residual 17, is a very good estimate of the whitened direct path signal. It is fed back to a bank of delayers 11 and frequency shifters 16. The outputs of the bank of delayers and frequency shifters are multiplied by a set of adjustable coefficients 15. These coefficients are adjusted, along with the whitening coefficients, to form the very accurate replicas of the whitened multipath noise caused by each reflector. These are summed and subtracted 14 from the multipath canceler input 13 to form the residual 17. The coefficients $w_1, w_2, w_3, \ldots, x_{11}, x_{12}, x_{13}, \ldots, x_{21}, x_{22}, x_{23}, \ldots, x_{31}, x_{32}, x_{33}, \ldots$ are determined by minimizing the root mean square (r.m.s.) residual 17 by the Marquardt method of nonlinear least squares. The minimization of the residual 17 by nonlinear least squares will be described in eq. (20). The operation of the multipath canceler will be explained in eqs. (24–29).

The differential delay and frequency shift for each target is measured by the filter weight $x_{mn}$ which corresponds to the differential delay nD and frequency shift mƒ caused by that target. The magnitude of the filter weight is a measure of the strength of the target.

From the multipath canceler processing shown in the Figure, the residual 17 is $$r_i = v_i - \sum_{n=1}^{N} \sum_{m=-M}^{M} x_{mn} r_{i-n} E^m; \quad i = 1, 2, \ldots, I \quad (17)$$

where $v_i$ 13 is the whitened direct path signal plus multipath plus receiver noise and the $x_{mn}$ 15 are the frequency shift-delay filter coefficients. The last term in eq. (17) is the sum of the multipath replicas 14. Note that the residual is defined recursively. To start the recursion, one assumes that $r_{i-n}$ is zero for i−n<1. Equations (15) and (17) correspond to that of Box [Ref. 11, BOX, p. 498] and Hayes [Ref. 20, HAYES, pp. 15, 64, 183, 287, 292, 377]. One can minimize the root mean squared (r.m.s.) residual $$\sqrt{\frac{1}{I} \sum_{i=1}^{I} |r_i|^2} \quad (18)$$

over $$w_1, w_2, \ldots, w_L, x_{-M,1}, x_{-M,2}, \ldots, x_{-M,N}, x_{-M+1,1}, x_{-M+1,2}, \ldots,$$
$$x_{-M+1,N}, \ldots, x_{M,N} \quad (19)$$

by the Marquardt method of nonlinear least squares [Ref. 11, BOX, p. 504, p. 505] [Ref. 12, MARQUARDT, p. 431].

The problem solved by the invention is that a direct path signal is corrupted by reflections from stationary and moving objects. These reflectors create modified versions of the direct path signal. A reflector modifies the direct path signal by delaying it, frequency shifting it, changing its amplitude and changing its phase. The adaptive filter does two things: 1. it purifies the corrupted direct path signal and 2. takes this purified form and modifies it in a manner replicating each reflector and subtracts it from the original corrupted signal completing the process, that is, creating the purified version of the direct path signal.

The method repeatedly processes a selected time segment of samples of the original corrupted signal. The first step has all filter coefficients zero, that is, nothing is subtracted from the original signal and the output, that is, the residual, is the same as the original input. Although the output is corrupted with reflections, the major portion is the direct path. This output is used in the second step to form replicas of the reflected signals and to subtract them from the corrupted signal by least squares to form a new residual output which is an improved approximation to the direct path signal.

The replicas are formed by passing the previous output, an approximation to the direct path signal, through the filter which forms the replicas by applying the coefficients to delay, frequency shift and adjust the amplitude and phase in a manner parallel to how the reflected signals are produced. This process is repeated until it converges. In the computer code example, it converged in three steps. At convergence, the significant reflections are removed because the process mimics, nearly exactly, the process of the formation of the reflections.

To understand the method, suppose that all the coefficients matching a given reflector have been determined except for the amplitude. Now, vary this amplitude and with each variation note the average of the squared output. When the amplitude of the replica matches that of the reflector, the unwanted signal of the reflector is completely canceled. If the amplitude of the replica is either greater or less than the signal of the reflector, it is not canceled and the average of the squared output is increased. Therefore, the value of the amplitude which minimizes the average squared output is the desired result. This is how the method of least squares works.

The filter coefficients are determined by least squares [Ref. 20, HAYES, p. 376]. There are many ways to accomplish least squares. The method used in the computer code example is the Marquardt method [Ref. 12, MARQUARDT, p. 431], which is very efficient. Although the following method is inefficient, it is very simple and illustrates how least squares can be used to determine the coefficients which remove the unwanted reflections and purify the direct path signal.

The coefficients are represented by the subscripted x parameter. These coefficients represent the entire collection of possible delays, frequency shifts, amplitudes and phases of the interfering reflections. The method cycles through all of the coefficients, one at a time. It picks, say, a coefficient x. It varies this coefficient by a small amount, say, delta-x and runs the filter with this new value, along with the current values of all the other coefficient.

The output of the filter is subtracted from the corrupted direct path input signal. This produces the residual r which is changed from the previous value. If R, the average squared magnitude of r, is decreased, retain the new value of x. If R is increased, reverse the sign of delta-x and retain this value of x, after running the filter again, confirming that R is decreased.

The method repeats this process for all the other coefficients. Then, repeats the cycle until R, the average squared magnitude of r, stops decreasing, that is, until R is minimized. At this point, all of the significant reflections have been removed from the corrupted direct path input signal and the output signal is purified. An example of a more efficient method follows in detail.

The Marquardt method is a sophisticated form of simple nonlinear least squares. Simple nonlinear least squares can be expressed $$x' = x - \left[\left(\frac{\partial r}{\partial x}\right)^T \left(\frac{\partial r}{\partial x}\right)\right]^{-1} \left(\frac{\partial r}{\partial x}\right)^T r \qquad (20)$$

where the 2(L+N(2M+1)) dimensional coefficient vector is $$x = (w_1^R, w_1^J, w_2^R, w_2^J, \ldots, \qquad (21)$$
$$w_L^R, w_L^J, x_{-M,1}^R, x_{-M,1}^J, x_{-M,2}^R, x_{-M,2}^J, \ldots,$$
$$x_{-M,N}^R, x_{-M,N}^J, x_{-M+1,1}^R, x_{-M+1,1}^J, x_{-M+1,2}^R, x_{-M+1,2}^J, \ldots,$$
$$x_{-M+1,N}^R, x_{-M+1,N}^J, \ldots x_{M,N}^R, x_{M,N}^J)^T$$

the 2I dimensional residual vector is $$r = (r_1^R, r_1^J, r_2^R, r_2^J, \ldots, r_I^R, R_I^J)^T \qquad (22)$$

and the values of $r_i$ are found from eqs. (15) and (17) using x 12, 15 and $q_i$ 10, the sampled complex direct path signal plus multipath noise plus white receiver noise. The superscript R means "real part" and the superscript J means "imaginary part." The dimensionality of r must be greater than that of x. The 2I by 2(L+N(2M+1)) partial derivative matrix $$\left(\frac{\partial r}{\partial x}\right)$$

is calculated numerically, the superscript T means matrix transpose, the superscript -1 means matrix inverse and x' is the new value of x in the iterative nonlinear least squares calculation of eq. (20).

The method of nonlinear least squares is used to find the values of those coefficients which minimize the mean square residual. The method is iterative, that is, one starts with a set of coefficients, calculates the residuals, calculates an increment for each coefficient and increments the previous set of coefficients to find a new set of coefficients. See eq. (20). This process is repeated until it converges, that is, until one gets the same answer twice.

For example, let the coefficients be $w_1, w_2, w_3, x_{11}, x_{12}, x_{13}, x_{21}, x_{22}, x_{23}, x_{31}, x_{32}, x_{33}$, where there are 3 delays in the whitening filter and 3 delays and 3 frequency shifts in the canceler. There are a total of 12 coefficients to be determined, and since each complex coefficient has area and an imaginary part, a total of 24 values to be determined. The input signal plus multipath noise has been converted to a series of complex digital samples, say 1000 of them, that is, 2000 values. One starts the process by choosing a set of coefficients, say, all zero. The sequence of input samples are whitened under the control of the w coefficients and the multipath replicas 14 are subtracted from them to form the sequence of 1000 residual samples. The sequence of residual samples is fed back into the bank of delayers and frequency shifters controlled by the x coefficients. Since the residual is an approximation to the whitened direct path signal, the outputs of the bank of delayers and frequency shifters are sequences of whitened multipath replicas. These are subtracted from the whitened direct path signal plus whitened multipath. The result of this process is a sequence of 1000 complex residuals, that is, 2000 values. For the first iteration, the multipath may not be reduced, if at all. However, for the second iteration, an increment of the coefficients is calculated by nonlinear least squares. The first step is to calculate the partial derivatives of the 1000 residuals with respect to the 12 coefficients. This is done numerically by stepping each coefficient, one at a time, by a small delta and recalculating the 1000 residuals for each coefficient. The partial derivative is found by taking the difference between the stepped residual and the unstepped residual and dividing this difference by the delta. This gives a partial derivative matrix of 1000 by 12 complex elements, that is, 2000 by 24 real elements. A square 24 by 24 matrix is formed by matrix multiplying the 24 by 2000 transpose of the partial derivative matrix by the 2000 by 24 partial derivative matrix itself. The 24 increments to the first set of coefficients are, then, found by matrix multiplying the 24 by 24 matrix inverse of the square matrix times the 24 by 2000 transpose of the partial derivative matrix times the 2000 element vector of residuals. This process is repeated, that is, iterated until it converges, that is, until the same result is got twice. Upon convergence, the multipath content of the input signal plus multipath has been canceled and the residual, after the spectrum has been restored, is a purified version of the direct path signal.

The following is a mathematical explanation of how the invention removes the multipath and restores the original signal. First, consider the whitening process. For demonstration purposes, let all the $x_{mn}$ coefficients 15 in eq. (17) be zero. Then, the output of the whitener $v_i$ 13 equals the residual $r_i$ 17. When one solves eq. (15) for $q_i$ 10, the direct path signal plus multipath noise plus white receiver noise, he gets $$q_i = \sum_{l=1}^{L} w_l q_{i-l} + r_i \quad (23)$$

The process minimizes the root mean square of $r_i$ 17 over $w_l$ 12. The result is an optimum linear predictor of $q_i$, as the current value is predicted by a linear combination of previous values. The residual $r_i$ is the prediction error and must be white, for if it were not, it would contain some correlation which could be used to further reduce the prediction error. Now, since $v_i$ is the output of the whitener and is equal to $r_i$, the output 13 is white.

Now, to explain multipath canceling, using eq. (15), define the whitened direct path signal as $$p_i = s_i - \sum_{l=1}^{L} w_l s_{i-l} \quad (24)$$

and the modified white receiver noise as $$\zeta_i = \eta_i - \sum_{l=1}^{L} w_l \eta_{i-l} \quad (25)$$

Then, substituting eq. (1) into (15), using eqs. (24) and (25), and substituting eq. (15) into eq. (17), one obtains the form of the residual $$r_i = p_i + \sum_{n=1}^{N}\sum_{m=-M}^{M} a_{mn} e^{-j2\pi m f n D} p_{i-n} E^m + \zeta_i - \sum_{n=1}^{N}\sum_{m=-M}^{M} x_{mn} r_{i-n} E^m \quad (26)$$

Note that only delayed samples of the whitened direct path signal $p_i$, contained by $r_{i-n}$, are subtracted from $p_i$, so that it is not possible to cancel the whitened direct path signal $p_i$ by varying $x_{mn}$ since $p_i$, because it is white, is uncorrelated with delayed versions of itself. Note that $r_{i-n}$ contains $p_{i-n}$ but not $p_i$.

In eq. (26) if $$x_{mn} = a_{mn} e^{-j2\pi m f n D} \quad (27)$$

and $$r_i = p_i \quad (28)$$

that is, if the modified receiver noise $\zeta_i$ is zero, the fourth term cancels the second term exactly and the multipath is totally removed. This occurs when the root mean square of the residual $r_i$ is minimized. This is so because $p_i$ is white and cannot be reduced further by linear combinations of $r_{i-n}$ since $r_{i-n}$ contains $p_{i-n}$ but not $p_i$. Of course, the modified receiver noise $\zeta_i$ is small, but not zero. Eqs. (27) and (28) are only approximate and the multipath is not totally canceled. This cancellation error $\xi_i$, the difference of the two double sums in eq. (26), due to a small $\zeta_i$, is small and eq. (26) becomes $$r_i = p_i + \zeta_i + \xi_i \quad (29)$$

Note that eq. (29) shows that the residual $r_i$ is a good approximation to the whitened direct path signal $p_i$. The key to understanding the operation of this invention is the recognition that the residual is a highly accurate estimate of the whitened direct path signal.

From the definition of unwhitening in eq. (16), define the unwhitened cancellation error $$\varepsilon_i = \xi_i + \sum_{l=1}^{L} w_l \varepsilon_{i-l} \quad (30)$$

Solving (24) and (25) for $s_i$ and $\eta_i$, and adding $s_i$, $\eta_i$ and $\epsilon_i$, one gets $$s_i + \eta_i + \varepsilon_i = p_i + \zeta_i + \xi_i + \sum_{l=1}^{L} w_l(s_{i-l} + \eta_{i-l} + \varepsilon_{i-l}) \quad (31)$$

Comparing eq. (31) to eq. (16) and using eq. (29), one has, for the restored direct path signal, $$u_i = s_i + \eta_i + \epsilon_i \quad (32)$$

which is the output of the unwhitening filter. This is the desired result which restores the original direct path signal $s_i$ without multipath and with a small error $\eta_i + \epsilon_i$. The quantity $s_i$ is the original signal in complex form. To obtain the unmodulated original signal, one must, then, demodulate the unique modulation, such as AM, FM, etc., which occurred before the original signal was formed. If a reflector is a target, the $x_{mn}$ imply target differential range, range rate and magnitude.

The Appendix contains listings of computer programs written in the APL language and a sample computer rum. The programs embody the basic features of this invention. The computer run is a demonstration of its performance on simulated real data.

The program NORM generates simulated data. The program DELRES calculates the delay residuals. The program NLS minimizes the residuals defined in DELRES by nonlinear least squares.

The program NLS is first edited so as to output the residuals as RR. The program NORM is used to generate 100000 mean zero, variance 1, real, normally distributed, random numbers in X5. This represents a white 50000 Hz broadband signal sampled at 100000 samples per second with r.m.s. (root mean square) of 1. Two multipaths are simulated both of 0.1 magnitude. One is delayed 1 sample; the other is delayed 3 samples and both are added to X5. The result is put into XX5. The signal to multipath noise ratio is calculated to be 17 dB. The NLS program is applied to XX5 and the two multipath noises are canceled to a level of 51 dB signal to multipath noise ratio.

A simple test of the concept of this invention was made with the computer program shown in the Appendix. The Marquardt method, similar to eq. (20), for nonlinear least squares [Ref. 11, BOX, p. 504, p. 505] [Ref. 12, MARQUARDT, p. 431] was programmed in the APL language in program NLS. The equation for the residual, eqs. (15) and (17), was programmed in DELRES with $$x_{mn} = 0 \text{ when } m \neq 0 \tag{33}$$

and $$w_i = 0 \tag{34}$$

That is, the reflectors were assumed to be stationary, causing no frequency shift, and the direct path signal was assumed to be white and did not need whitening.

The original signal $s_i$ was generated with a Gaussian, or normally distributed, random number generator in program NORM with root mean square (r.m.s.) of 1 and I=100000. This corresponds to one second of a 50000 Hz bandwidth signal represented by 100000 real samples. The data is white, zero mean, Gaussian with r.m.s.=1.

The received signal q, was generated, eq. (1), with $$\alpha_{01} = \alpha_{03} = 0.1, \text{ otherwise} = 0 \tag{35}$$

and $$\eta_i = 0 \tag{36}$$

This corresponds to two multipaths both of magnitude 0.1, one is delayed 1 sample, the other is delayed 3 samples. The white signal itself provides an effective noise which perturbs the estimates.

The process converged in three iterations, the final r.m.s. residual=1.002370568. The three coefficients $x_{01}, x_2, x_{03}$ are shown to be approximately=0.1, 0.0, 0.1 matching $a_{01}, a_{12}, a_{03}$ with r.m.s. errors of about 0.003. The mean residual was about 0.0087. The original signal to multipath noise ratio was 17 dB. After processing, the two multipaths were canceled to a signal to multipath noise ratio of 51 dB.

The filter weight $x_{mn}$ corresponding to a moving target is a measure of the differential range nDc and range rate m$f$c where c is the speed of light. The system, with a common antenna, can be duplicated to receive two signals each from each of two widely separated transmitters. Geometric triangulation [Ref. 18, SKOLNIK, p.25.5, p.25.13] can be used to measure the two dimensional position and velocity of the target. Triplication can be used for three dimensional position and velocity.

Given the differential path lengths from two transmitters to a target to the receiver, one can calculate the two dimensional position of the target from geometry. The positions of the transmitters and the receiver are known. The differential delays, therefore, are functions of the two dimensional target position. For example, the length of the direct path from one of the transmitters to the receiver can be calculated from their known positions. The length of the reflected path depends on the target position. One adds the distance from the transmitter to the target to the distance from the target to the receiver. The differential path length is the reflected path minus the direct path. There is also a measurement of the differential path length. One, therefore, has two equations, one for each of the two measurements, in two unknowns, the two dimensions of the position of the target. These two nonlinear equations can be solved for target position. The three dimensional position of the target can be found with three measurements from three transmitters, that is, by solving three equations in three unknowns. Target velocity can be obtained in a similar manner from the differential range rate measurements.

Another use of the system is to detect the angle of moving targets. If multiple receive antennas are provided, each connected with a system like that shown in the Figure, the angle of a moving target causing a multipath reflection from a single transmitter to the target to the receiving antennas can be measured by using the relative phases of the corresponding differential delay nD and frequency shift m$f$ complex coefficients $x_{mn}$ 15 across the several receiving antennas [Ref. 18, SKOLNIK, p.3.34, p.3.35].

For example, the differential complex phase angle at a receive antenna is $$\phi = \frac{2\pi}{\lambda}(R + R_2 - R_1) \tag{37}$$

where $\lambda$ is the wave length of the transmission, R is the distance from the transmitter to the target, $R_1$ is the distance from the transmitter to the receive antenna and $R_2$ is the distance from the target to the receive antenna. The difference in the phase angle between this receive antenna and another antenna located at a distance of a away is $$\Delta\phi = \frac{2\pi}{\lambda}a(\cos\alpha_2 - \cos\alpha_1) \tag{38}$$

where $\alpha_1$ is the angle from the line between the two receive antennas to the transmitter and $\alpha_2$ is the angle from the line between the two receive antennas to the target. Since a and $\alpha_1$ can be calculated from known geometry and $\Delta\phi$ is measured, eq. (38) can be solved for $\alpha_2$, the desired angle to the target.

The receiving antennas, receivers and processing system can be placed in a surveillance aircraft the position and velocity of which is obtained by an accurate navigation system such as GPS. Objects on the ground, interferers and targets causing multipath reflections can be processed by the system Ground reflections, known as clutter, can be canceled by this invention as, from the moving platform, they appear to be moving. The position and velocity of a moving target can also be measured with respect to the moving platform. Target position and velocity with respect to the ground can be obtained by adding the position and velocity of the surveillance aircraft to the measured position and velocity of the target.

Reference to Appendix Containing Computer Program

The Appendix contains listings of computer programs written in the APL language and a sample computer run. The programs embody the basic features of this invention. The computer run is a demonstration of its performance on simulated real data.

The program NORM generates simulated data. The program DELRES calculates the delay residuals. The program NLS minimizes the residuals defined in DELRES by nonlinear least squares.

The program NLS is first edited so as to output the residuals as RR The program NORM is used to generate 100000 mean zero, variance 1, normally distributed, real random numbers in X5. This represents a white 50000 Hz broadband signal sampled at 100000 samples per second with r.m.s. (root mean square) of 1. Two multipaths are simulated both of 0.1 magnitude. One is delayed 1 sample; the other is delayed 3 samples and both are added to X5. The result is put into XX5. The signal to multipath noise ratio is calculated to be 17 dB. The NLS program is applied to XX5 and the two multipath noises are canceled to a level of 51 dB signal to multipath noise ratio.

References

All footnoted references are hereby incorporated by reference.

| cit. no. | patent no. | name | date |
|---|---|---|---|
| [1] | 6,031,882 | ENGE | Feb. 29, 2000 |
| [2] | 6,031,881 | WEILL | Feb. 29, 2000 |
| [3] | 5,918,161 | KUMAR | Jun. 29, 1999 |
| [4] | 5,630,208 | ENGE | May 13, 1997 |
| [5] | 5,966,411 | STRUHSAKER | Oct. 12, 1999 |
| [6] | 5,995,538 | LOMP | Nov. 30, 1999 |
| [7] | 5,615,232 | VAN NEE | Mar. 25, 1997 |
| [8] | 5,809,064 | FENTON | Sep. 15, 1998 |
| [9] | 5,673,286 | LOMP | Sep. 30, 1997 |
| [10] | 5,923,703 | PON | Jul. 13, 1999 |

Non Patent Literature

[11] BOX, GEORGE E. P., JENKENS, GWILYM M., *Time Series Analysis: Forecasting and Control*, 1976, p. 498, p. 504, p. 505, Holden-Day, San Francisco

[12] MARQUARDT, D. W., "An algorithm for least squares estimation of non-linear parameters", *Journ. Soc. Ind. Appl. Math.*, 1963, p. 431, Vol 11.

[13] OPPENHEIM, ALAN V., SCHAFER, RONALD W., *Digital Signal Processing*, 1975, p. 261, Prentice-Hall, Englewood Cliffs, N.J.

[14] PAPOULIS, ATHANASIOS, *The Fourier Integral and its Applications*, 1962, p.15, McGraw-Hill, New York

[15] PAPOULIS, ATHANASIOS, *Signal Analysis*, 1977, p. 45, McGraw-Hill, New York

[16] RABINER, LAWRENCE R, GOLD, BERNARD, *Theory and Application of Digital Signal Processing*, 1975, p. 100, Prentice-Hall, Englewood Cliffs, N.J.

[17] ROHDE, ULRICH L., BUCHER, T. T. N., *Communications Receivers Principles and Design*, 1988, p. 14, p. 361, McGraw-Hill, New York

[18] SKOLNIK, MERRILL I.(ed.), *Radar Handbook, Second Edition*, 1990, p. 3.34, p. 3.35, p. 18.46, p. 25.5, p. 25.13, McGraw-Hill, New York

[19] VAN VALKENBURG, MAC E.(ed.), *Reference Data for Engineers*, 1993, p. 23–6, p. 28–7, Prentice-Hall, 11711 North College, Carmel, Ind. 46032, USA.

[20] HAYES, MONSON H., *Digital Signal Processing*, 1999, McGraw-Hill, New York.

Statement Regarding Federally Sponsored R&D

No Federal funds were used to conceive or develop this invention.

APPENDIX

| COMPUTER PROGRAMS AND SAMPLE RUN | |
|---|---|
| | ∇NORM[□]∇ |
| [0] | X←NORM N;Z;T;R |
| [1] | ⍝ ;; |
| [2] | ⍝ 961204.1712 |
| [3] | ⍝ GENERATE N NORMAL RANDOM VARIABLES, MEAN 0, SIGMA 1 |
| [4] | ⍝ □RL IS SEED |
| [5] | Z←2, ⌈N÷2 |
| [6] | Z←Zρ(÷10000)×?(×/Z)ρ10000 |
| [7] | T←(o2)×Z[1;] |
| [8] | R←(-2×⊛Z[2;])*0.5 |
| [9] | X←N↑,(1 1°.×R)×2 1°.oT |
| ∇ | 1996-12-10 11.00.01 (GMT-4) |
| | ∇DELRES[□]∇ |
| [0] | R←Y DELRES X;N;I |
| [1] | ⍝ ;; |
| [2] | ⍝ 000323.2241 |
| [3] | ⍝ DELAY RESIDUALS |
| [4] | N←ρX |
| [5] | R←0×Y |
| [6] | R[ιN]←Y[ιN] |
| [7] | I←0 |
| [8] | NEXTI:I←I+1 |
| [9] | R[N+I]←Y[N+I]−R[N+I−ιN]+.×X |
| [10] | →NEXTIxιI<(ρY)−N |
| [11] | R←N↓R |
| ∇ | 2000-03-25 22.51.47 (GMT-4) |
| | ∇NLS[□]∇ |
| [0] | XE←XD NLS RES;X;ΔX;R;P;J;ΔR;A;B;D;EM;E;I;EE;AA |
| [1] | ⍝ ;RES; |
| [2] | ⍝ 800225.0914 800820 000321.1532 |
| [3] | ⍝ NONLINEAR LEAST SQUARES |
| [4] | ⍝ CHAR. VECT. RES IS RESIDUAL FUNCTION NAME |
| [5] | X←XD[1;] |

APPENDIX-continued

COMPUTER PROGRAMS AND SAMPLE RUN

```
[6]        ΔX←XD[2;]
[7]        EE←' '
[8]        I←0
[9]     NEXTI:I←I+1
[10]       R←⌬RES,' X'
[11]    ⍝      (R A B)←⌬RES,'(X ΔX)'
[12]    ⍝      EE←EE,(÷/+/(R*2),[0.5]1)*0.5
[13]          (÷/+/(R*2),[0.5]1)*0.5
[14]    ⍝   ANALYTIC RESIDUAL PARTIALS
[15]    ⍝      P←⌬(RES,'P'),' X'
[16]    ⍝→ANPAR
[17]    ⍝   CALCULATE R, A AND B
[18]    ⍝      (R A B)←⌬RES,'(X ΔX)'
[19]    ⍝      →CALCRAB
[20]    ⍝   NUMERIC RESIDUAL PARTIALS
[21]       P←' '
[22]       J←0
[23]    NEXTJ:J←J+1
[24]       ΔR←(⌬RES,' X+ΔX[J]×J=ιρX')-R
[25]       P←P,ΔR÷ΔX[J]
[26]       →NEXTJ×ιJ<ρX
[27]       P←φ((ρX),(ρP)÷ρX)ρP
[28]    ANPAR:A←(φP)+.×P
[29]       B←(φP)+.×R
[30]    CALCRAB:
[31]       D←÷(((0 1+ρA)ρA)[;1]+1E⁻10)*0.5
[32]       AA←(A×D°.×D)+1E⁻10×(ρA)ρ1,0×A
[33]       X←X-D×(D×B)⌹AA
[34]       →NEXTI×ιI<3
[35]       R←⌬RES,' X'
[36]    ⍝      (R A B)←⌬RES,'(X ΔX)'
[37]       EM←÷/+/R,[0.5]1
[38]       E←(÷/+/(R*2),[0.5]1)*0.5
[39]       XE←(X,EM),[0.5]E×(((0 1+ρAA)ρ(D°.×D)×⌹AA)[;1],1)*0.5
[40]    ⍝   EE,E
[41]       E
[42]    ⍝   ' '
[43]    ⍝   XE
[44]    ⍝   →NEXTI×ιI<20
[45]    ⍝   RR←R
        ∇ 2000-03-29 23.00.55 (GMT-4)
        ∇NLS[□45]
[45]    ⍝   RR←R
[45]       RR←R
[46]    ∇
        ρX5←NORM 100000
100000
        □←S←(÷/+/((X5)*2),[.5]1)*.5
1.002357739
        ρXX5←X5[3+ι99997]+.1×X5[(ι99997)°.+⁻1+ι4]+.×1 0 1 0
99997
        □←N←(÷/+/((XX5-3+X5)*2),[.5]1)*.5
0.1418755036
        20×10⊛S÷N
16.98230664
        (2 3ρ0 0 0 .001 .001 .001)NLS 'XX5 DELRES'
1.011856929
1.002412348
1.00237057
1.002370568
0.09896411424  0.001084301862  0.09780701046  0.008745036907
0.003147221067  0.003163105505  0.003146911359  1.002370568
        □←N←(÷/+/((RR-6↓X5)*2),[.5]1)*.5
0.002841730873
        20×10⊛S÷N
50.94879605
```

What is claimed is:

1. A communication system comprising a radio transmitter transmitting a signal which is interfered with by fixed reflectors and moving reflectors, said system comprising an antenna, a receiver and a multipath reduction subsystem comprising an analog to digital converter, a real to complex converter, a whitening filter with complex coefficients and a multipath canceller comprising an array of complex delay- Doppler shift coefficients, delayers of one sample and shifters of one frequency increment, said array producing a residual from which the interferences from said fixed reflectors and said moving reflectors have been removed, said multipath canceller comprising a minimizer minimizing the mean square of said residual over the said whitening filter coefficients and the said multipath canceller delay-Doppler coefficients, said subsystem comprising a spectrum restoring filter utilizing the said whitening filter coefficients restoring said original signal.

2. A multipath reduction subsystem for use in a communication system comprising a radio transmitter transmitting a signal which is interfered with by fixed reflectors and moving reflectors, said system comprising an antenna, a receiver and said multipath reduction subsystem comprising an analog to digital converter, a real to complex converter, a whitening filter with complex coefficients and a multipath canceller comprising an array of complex delay-Doppler shift coefficients, delayers of one sample and shifters of one frequency increment, said array producing a residual from which the interferences from said fixed reflectors and said moving reflectors have been removed, said multipath canceller comprising a minimizer minimizing the mean square of said residual over the said whitening filter coefficients and the said multipath canceller delay-Doppler coefficients, said subsystem comprising a spectrum restoring filter utilizing the said whitening filter coefficients restoring said original signal.

3. A multipath reduction method for use in a communication system comprising a radio transmitter transmitting a signal which is interfered with by fixed reflectors and moving reflectors, said system comprising an antenna, a receiver and an analog to digital converter, said multipath reduction method comprising reducing multipath by converting real sampled data to complex sampled data, whitening said complex sampled data by filtering with complex coefficients and cancelling said multipath by delaying and frequency shifting the residual under control of the complex delay-Doppler shift coefficients producing said residual from which the interferences from said fixed reflectors and said moving reflectors have been removed, said whitening filtering coefficients and said multipath cancelling delay-Doppler shift coefficients being determined by minimizing the mean square of said residual, said multipath reduction method comprising restoring the spectrum of said signal by filtering utilizing the said whitening filtering coefficients to restore said signal.

4. A surveillance system with targets which are moving reflectors, with interfering fixed reflectors and with interfering moving reflectors, said system comprising one or more stationary or moving transmitters, one or more stationary or moving antennas, one or more receivers and a surveillance subsystem comprising a multipath reduction subsystem for each receiver, said multipath reduction subsystem comprising an analog to digital converter, a real to complex converter, a whitening filter with complex coefficients and a multipath canceller comprising an array of complex delay-Doppler shift coefficients, delayers of one sample and shifters of one frequency increment, said array producing a residual from which the interferences from said fixed reflectors, said moving reflectors and said targets have been removed, said multipath canceller comprising a minimizer minimizing the mean square of said residual over the said whitening filter coefficients and the said multipath canceller delay-Doppler coefficients, said surveillance subsystem comprising, for each receiver, a target measurer giving differential range and differential range rate from said delay-Doppler coefficients, said target measurer, if more than one antenna is provided, giving target angle from the relative phases of said complex delay-Doppler coefficients, said surveillance subsystem comprising a target tracker utilizing the said measured differential range, said differential range rate, said angle and the position and velocity of the platform on which said antennas are mounted, said position and said velocity being determined by a navigation subsystem, said tracker locating and tracking said target or targets.

5. A surveillance subsystem for use in a surveillance system with targets which are moving reflectors, with interfering fixed reflectors and with interfering moving reflectors, said system comprising one or more stationary or moving transmitters, one or more stationary or moving antennas and one or more receivers, said surveillance subsystem comprising a multipath reduction subsystem for each receiver, said multipath reduction subsystem comprising an analog to digital converter, a real to complex converter, a whitening filter with complex coefficients and a multipath canceller comprising an array of complex delay-Doppler shift coefficients, delayers of one sample and shifters of one frequency increment, said array producing a residual from which the interferences from said fixed reflectors, said moving reflectors and said targets have been removed, said multipath canceller comprising a minimizer minimizing the mean square of said residual over the said whitening filter coefficients and the said multipath canceller delay-Doppler coefficients, said surveillance subsystem comprising, for each receiver, a target measurer giving differential range and differential range rate from said delay-Doppler coefficients, said target measurer, if more than one antenna is provided, giving target angle from the relative phases of said complex delay-Doppler coefficients, said surveillance subsystem comprising a target tracker utilizing the said measured differential range, said differential range rate, said angle and the position and velocity of the platform on which said antennas are mounted, said position and said velocity being determined by a navigation subsystem, said tracker locating and tracking said target or targets.

6. A surveillance method for use in a surveillance system with targets which are moving reflectors, with interfering fixed reflectors and with interfering moving reflectors, said system comprising one or more stationary or moving transmitters, one or more stationary or moving antennas, one or more receivers each with an analog to digital converter, said surveillance method comprising reducing multipath for each receiver, by converting real sampled data to complex sampled data, whitening said complex sampled data by filtering with complex coefficients and cancelling said multipath by delaying and frequency shifting the residual under control of the complex delay-Doppler shift coefficients producing said residual from which the interferences from said fixed reflectors, said moving reflectors and said targets have been removed, said whitening filtering coefficients and said multipath cancelling delay-Doppler shift coefficients being determined by minimizing the mean square of said residual, said surveillance method comprising, for each receiver, measuring said target or targets by obtaining differential range and differential range rate from said delay-Doppler shift coefficients, and if more than one antenna is provided, obtaining target angle from the relative phases of said complex delay-Doppler shift coefficients, said surveillance method comprising locating and tracking said target or targets utilizing the said measured differential range, said differential range rate, said angle and the position and velocity of the platform on which said antennas are mounted, said position and said velocity being determined by a navigation subsystem.

* * * * *